US007310610B2

(12) United States Patent
Fujita et al.

(10) Patent No.: US 7,310,610 B2
(45) Date of Patent: Dec. 18, 2007

(54) METHODS OF NETWORK AUCTION AND NETWORK AUCTION SUPPORT, SYSTEMS OF NETWORK AUCTION SERVER AND AUCTION SUPPORT SERVER, AND RECORDING MEDIUM

(75) Inventors: Takeshi Fujita, Chiba (JP); Hitoshi Endoh, Saitama (JP); Nariaki Hatta, Tokyo (JP); Yasufumi Fujikawa, Kanagawa (JP); Yutaka Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 691 days.

(21) Appl. No.: 09/920,521

(22) Filed: Aug. 1, 2001

(65) Prior Publication Data

US 2002/0082975 A1    Jun. 27, 2002

(30) Foreign Application Priority Data

Aug. 2, 2000    (JP)    ............................. 2000-234722

(51) Int. Cl.
*G06Q 40/00*    (2006.01)
(52) U.S. Cl. ............................. 705/26; 705/27; 705/37
(58) Field of Classification Search .................. 705/26, 705/37
See application file for complete search history.

(56) References Cited

U.S. PATENT DOCUMENTS

| 5,835,896 | A | * | 11/1998 | Fisher et al. | ................... | 705/37 |
| 5,890,138 | A | * | 3/1999 | Godin et al. | ................... | 705/26 |
| 5,960,086 | A | * | 9/1999 | Atalla | ........................ | 380/44 |
| 6,006,201 | A | | 12/1999 | Berent et al. | | |
| 6,026,383 | A | | 2/2000 | Ausubel | | |
| 6,058,417 | A | * | 5/2000 | Hess et al. | ................... | 709/219 |
| 6,415,320 | B1 | * | 7/2002 | Hess et al. | ................... | 709/219 |
| 6,466,917 | B1 | * | 10/2002 | Goyal et al. | ................... | 705/18 |
| 6,647,373 | B1 | * | 11/2003 | Carlton-Foss | ................ | 705/37 |
| 7,047,210 | B1 | * | 5/2006 | Srinivasan | ................... | 705/26 |
| 2001/0049648 | A1 | * | 12/2001 | Naylor et al. | ................. | 705/37 |

FOREIGN PATENT DOCUMENTS

| EP | 0 828 223 A2 | 3/1998 |
| WO | WO 96/34356 | 10/1996 |
| WO | WO 00/39735 | 7/2000 |

OTHER PUBLICATIONS

Gralla, P., "How the Internet Works" Milliennium Edition, Copyright 1999.*
Search Report from Austrian Patent Office in corresponding Singapore Patent Application No. 200104627-5.

* cited by examiner

*Primary Examiner*—Jagdish N Patel
(74) *Attorney, Agent, or Firm*—Finnegan, Henderson, Farabow, Garrett & Dunner, L.L.P.

(57) ABSTRACT

In a network auction, bidder clients are enabled to recognize ongoing auction sessions substantially on real time. An information image which integrates as a single handling unit an image information pertaining to an auction exhibit item and a related information which guides to establish communication with a particular network auction server through operation of the operator in accordance with this image information is created, and down-linked to the bidder clients to speed up the auction procedure. Thereby, enabling the bidder client to access to a bidding home page on the auction site simply and easily, and to know the ongoing bidding competitive situation almost on real time by tracking the information image created.

10 Claims, 16 Drawing Sheets

FIG. 11

AUCTION EXHIBITION REGISTRATION

| IMAGE FILE NAME TO UPLOAD | | REFERENCE | 1101

DESCRIBE FEATURES OF THIS MERCHANDISE

THIS IS A PERFECT STEREO SPEAKER
YOU'D BE CONVINCED OF THIS SOUND HOW FASTIDIOU YOU ARE! —1102

LOWEST BIDDING PRICE —1103

AUCTION SITE SELECTION
　　○ A-AUCTION　　○ D-AUCTION
　　○ B-AUCTION　　○ E-AUCTION —1104
　　○ C-AUCTION　　○ F-AUCTION

TEMPORARY REGISTRATION —1105

FIG. 14

```
<form enctype="multipart/form-data"
action="/scripts/cpshost.dll?PUBLISH?http://Server/scripts/Confirm.asp"
method="POST" id=form1 name=form1>
<input type="hidden" name="TargetURL" value="http://Server/Upload">
<TABLE>
<tr>
<td align="left">IMAGE FILE NAME TO UPLOAD</td>
<td align="left"><input name="filePic" type="file"size="20"></td>
</tr>
<tr>
<td align="left">RELATED INFORMATION FILE NAME TO UPLOAD</td>
<td align="left"><input name="fileinfo" type="file size="20"></td>
</tr>
<tr>
<TD>
<input type="Submit" value="TEMPORARY REGISTRATION" id="Submit" name="Submit"></TD
<TD></TD>
</tr>
</table></center>
</form>
```

FIG. 18

| CLAIM NOS. | CLAIM DESCRIBING TECHNOLOGY RELIED-ON | | | | | | | | KEYPOINTS | CATEGORIES |
|---|---|---|---|---|---|---|---|---|---|---|
| | 1 | 2 | 3 | 4 | 5 | 6 | 7 | 8 | | |
| 1 | | | | | | | | | A METHOD OF CONDUCTING AUCTION WHEREBY TO PERFORM A SERIES OF OPERATION AT A BIDDING CLIENT AUCTION SERVER | A NETWORK AUCTION METHOD |
| 2 | O | | | | | | | | IN THE AUCTION FOR CONDUCTING A SERIES OF OPERATION AT A BIDDING CLIENT AUCTION SERVER, A METHOD OF REALIZING THEREOF USING INFORMATION IMAGES | A NETWORK AUCTION METHOD |
| 3 | | | | | | | | | A METHOD OF CONDUCTING AUCTION USING AN AUCTION SUPPORT SERVER IN ADDITION TO THE BIDDING CLIENT AUCTION SERVER | A NETWORK AUCTION METHOD |
| 4 | | | O | | | | | | "A METHOD OF NETWORK AUCTION SUPPORT" DESCRIBING THE OPERATION IN THE AUCTION SUPPORT SERVER OUT OF THE METHOD OF CONDUCTING AUCTION DESCRIBED IN CLAIM 3 | A NETWORK AUCTION SUPPORT METHOD |
| 5 | | | O | | | | | | IN AUCTION BY CONDUCTING A SERIES OF OPERATION USING BIDDER CLIENT AUCTION SERVER/AUCTION SUPPORT SERVER, A METHOD OF REALIZING THE SAME USING THE INFORMATION PICUTRE | A NETWORK AUCTION METHOD |
| 6 | | | O | | | | | | IN AUCTION BY CONDUCTING A SERIES OF OPERATION USING BIDDER CLIENT AUCTION SERVER/AUCTION SUPPORT SERVER, "NETWORK AUCTION SUPPORT METHOD" WHEREIN THE AUCTION SUPPORT SERVER CREATES INFORMATION IMAGE | A NETWORK AUCTION SUPPORT METHOD |
| 7 | O | | | | | | | | APPARATUS FOR REALIZING THE METHOD AS CLAIMED IN CLAIM 1 | A NETWORK AUCTION SERVER |
| 8 | | | | | | O | | | SUPPORT APPARATUS FOR REALIZING THE METHOD AS CLAIMED IN CLAIM 6 | AUCTION SUPPORT SERVER |
| 9 | | | | | | | O | | RECORDING MEDIUM WHICH CONSTITUTES THE NETWORK AUCTION SERVER | RECORDING MEDIUM |
| 10 | | | | | | | | | RECORDING MEDIUM WHICH CONSTITUTES THE AUCTION SUPPORT SERVER | RECORDING MEDIUM |

METHODS OF NETWORK AUCTION AND NETWORK AUCTION SUPPORT, SYSTEMS OF NETWORK AUCTION SERVER AND AUCTION SUPPORT SERVER, AND RECORDING MEDIUM

CROSS REFERENCE TO RELATED APPLICATIONS

This application claims priority to Japanese Patent Application JP 2000-234722, and the disclosure of that application is incorporated herein by reference to the extent permitted by law.

BACKGROUND OF THE INVENTION

1. Field of the Invention

The present invention relates to an auction server that is connected to a network to which information terminals mainly such as personal computers and the like are connected. More specifically, it relates to a method of conducting a network auction capable of improving an efficiency of bidding procedures by displaying a current state of bidding at all times to a bidding client.

2. Related Art

Recently, with a proliferation of the internet, many trading sites are emerging on the internet, which, by displaying a photograph and a text describing a trading item on a home page, invite an interested client to apply for its purchase, thus carrying out the trading to sell and buy the item on the internet. In such trading sites, if a quantity of trading items is limited, a so-called auction approach is used. There are several types for determining a winning bidding price on auction. For example, in case there is only one item to sell, an approach to determine only one bidder who placed a highest price to win is adopted. In case there are a plurality of items to sell, an approach to determine winners from one who placed a highest price to those who placed a second highest price, a third highest price and so on is adopted, or another approach in which while the winners are determined in the same manner described above, however, all the bidding prices are set at a lowest winning price placed by the last winning bidder is adopted.

Generally, in these auctions, a last winning bidder(s) is determined in such a manner that when its auction exhibit item is disclosed on the server connected to the network, a respective bidder monitoring the exhibited item on the server offers a respective price that he/she considers appropriate or affordable to pay, then the server after comparison of respective bidding prices offered from a plurality of bidder clients, finally determines the winner bidder(s).

SUMMARY OF THE INVENTION

However, generally these auction sites on the internet are allowed to access a browser such as the Internet Explorer (Micro Soft Corp.) or the Net Navigator (NetScape Corp) via the internet. Therefore, in order for any interested bidder to be able to learn a current bidding prices of a merchandise for sale by auction, one must repeatedly access by frequently connecting to the auction site server to recognize its current status of the auction. This has imposed a problem in conducting a speedy auction.

The present invention has been contemplated to alleviate the above-mentioned problem associated with the related art by provision of the following method and apparatus. By the way, the "transaction price" used here is intended to mean that supposing there was at least another bidder client who offered another bidding price, and if this auction has been closed at this instant, this bidden price determined as a highest bidding price or a winning price (transaction price).

1. An Invention as Claimed in Claim 1:

An aspect of the invention as claimed in claim 1 is contemplated to alleviate the above-mentioned problem associated with the related art, and an object thereof is to provide a method of performing a network auction, which is comprised of the steps of: enabling a bidder client to display an auction information pertaining to an auction exhibit item which is registered in a network auction server; recording an identification (ID) code of the bidder client when the bidder client requests a notification of the information pertaining to the auction exhibit item; and notifying the bidder client having the identification (ID) code of an updated transaction price when a transaction price changes from a price at its bidding by auction.

Here, the step of enabling the display of the information pertaining to the auction exhibit item to the bidder client functions to enable an operator who operates the bidder client to evaluate the exhibit item submitted to the auction. The identification (ID) code of the bidder client which is a code for identifying the bidding client is used to identify an address of the bidder client when downloading the information from the network auction server to the bidder client. The notification of an updated transaction price functions to allow the operator of the bidder client to omit an information acquisition operation necessary for recognizing the current status of the auction.

2. An Invention as Claimed in Claim 2:

An aspect of the invention as claimed in claim 2 is contemplated to alleviate the above-mentioned problem, and an object thereof is to provide a method of performing a network auction, characterized by comprising the steps of: creating an information image which combines as a single handling unit the image information and a related information which establishes communication with the network auction server through manipulation of the operator in accordance with the image information when registering an image information pertaining to an auction exhibit item in a network auction server; allowing to display the information image to the bidder client; recording an identification (ID) code of the bidder client when the bidder client requests notification of the information pertaining to the auction exhibit item; notifying and displaying the information image in which an updated transaction price is superimposed on its image information, to the bidder client corresponding to the identification code when a transaction price changes from a price at its bidding by auction.

Here, "the information image which combines as a single handling unit the image information and its related information which establishes communication with the network auction server through operation of the operator in accordance with the image information" provides a function for the operator of the bidder client to allow to identify a particular auction site where an auction item pertaining to the displayed image is exhibited and readily to establish communication with the network auction server performing the auction, using as a hint or clue the image displayed in the bidder client.

3. An Invention as Claimed in Claim 3:

An aspect of the invention as claimed in claim 3 is contemplated to alleviate the above-mentioned problem, and an object thereof is to provide an auction support server, and a method for operating the same to execute a predetermined operation. More specifically, this auction support server prompts a registration of an image information pertaining to an auction exhibit item to submit to the network auction server; creates an information image which combines as a single handling unit an image information pertaining to an auction exhibit item and its related information which establishes communication with a network auction server via operation of an operator in accordance with the image information when the image information is registered; and registers the information image as an biddable item in the network auction server.

Then, the network auction server, in response to a request from the operator of the bidder client, returns the information image pertaining to the biddable auction item to the bidder client, and after the information image is displayed to the bidder client, when the operator of the bidder client requests a notification of the information of the auction exhibit item, the auction support server is caused to record an identification (ID) code of the bidding client. Further, when the transaction price changes from the price at its bidding by auction, the network auction server notifies the auction support server of the change thereof, then the auction support server notifies the bidder clients whose identification codes have been recorded in the auction support server of an updated transaction price.

Here, the terms of "the information image that combines as one single handling unit the image information and its related information which establishes communication with the network auction server enabled by operation of the operator in accordance with the image information" functions to enable the operator of the bidder client to identify a particular auction on which the auction item pertaining to the image is exhibited using the displayed image as a hint or clue likewise the means described in claim 2 and readily to establish communication with the network auction server which performs the auction. Further, the identification (ID) code of the bidder client which is a code for identifying an individual bidder client functions to specify an recipient address when the information is provided from the network auction server.

4. Other Inventions as Claimed in Other Claims:

As to the other aspect of the invention as claimed in claims 4 and thereafter, because they are described with reference to FIG. 18, further descriptions thereof will be omitted here.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 11 is an example of display indicating auction registration form according to the invention.

FIG. 14 shows an essential part of a program using the Posting Acceptor for realizing image file transfer according to the invention.

FIG. 18 is a table indicating a relationship between respective scopes of the inventions as claimed in respective claims.

PREFERRED EMBODIMENT OF THE INVENTION

With reference to FIGS. 1 through 17, preferred embodiments of the invention will be described in the following. In the following description, an auction item is described as a "tangible asset", however, it is not limited thereto, and an intangible asset such as services or the like may be included as well.

1. A Common Concept:

First of all, a concept of the invention underlying commonly throughout a preferred embodiment of the invention and modifications thereof will be described. In particular, the information image of the invention, the operation required for registration to the network auction, and the configuration of the bidder client participating in the auction will be described in details.

1.1 A Related Information:

The related (associated) information will be described. The related information provides a basic information enabling a specific operation when the operator of the bidder client who recognizes this image wants to use this image as a clue for performing the specific operation. Namely, the related information is information associated with the image information, and when it is desired to have the operator of the client to refer to a specific information existing on a specific server, information such as a URL or an IP address that specifies this information corresponds thereto. Further, when a specific program is desired to be run, its related information may be the name of its program or the program itself. For example, it may be an information instructing to obtain a new image information from the server.

1.2 Information Image that Connotes the Information and the Related Information:

In the next, the information image that connotes the information and its related information, which is a common concept underlying throughout the embodiments of the invention, will be described with reference to FIGS. 7 and 8. Here, the information to connote may be an identifier capable of identifying the related information and/or its image.

Figure 7:
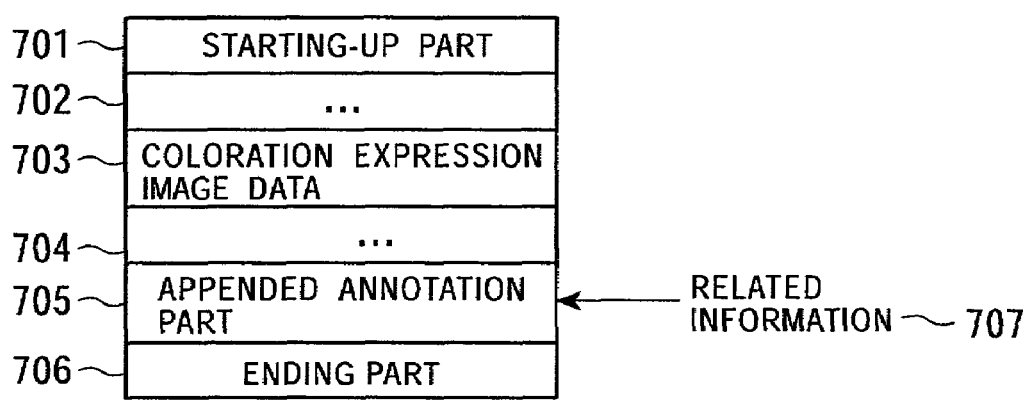
FIG. 7 is an example of configurations of information images.
Figure 8:
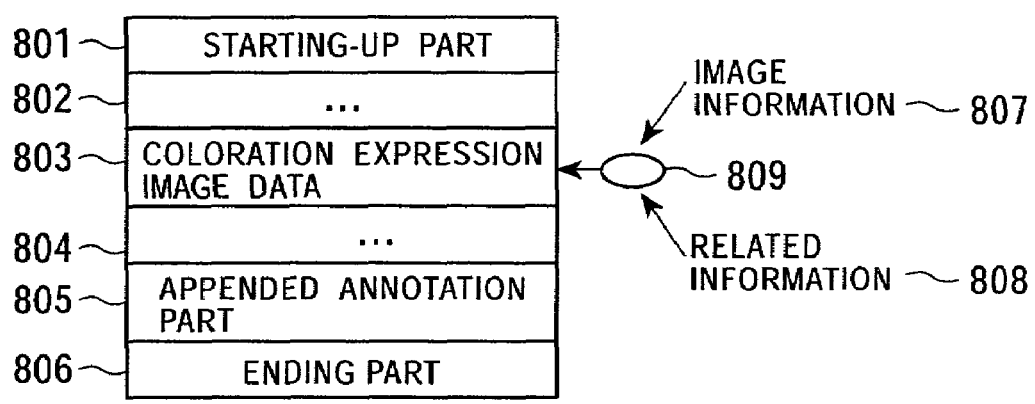
FIG. 8 is another example of configurations of the information images.

With reference to FIG. 7, an example of format of the information image in which its related information is embedded is shown. Here, the image information is described using an image presented in the GIF format as an example. However, its format is not limited to the GIF, and a JPG format, PCX format or the like may be used as well.

A starting-up part 701 is a field provided for identifying that the present information is an image information given in the GIF format, and a character string of 'GIF' and its version are allocated therein. A coloration expression image data 703 is an image data part in which pixels are arranged in the order from the left to the right and from the upper to the bottom directions. Here, in the case of the GIF, they are encoded using an LZW algorithm of variable code lengths. An appended annotation part 705 includes a text information other than an image information contained in the GIF data stream. This part is allowed to include all annotations pertaining to the image, the names of those who are concerned in its production and the contents, or every other data not related to the control and the image. Further, in the general mode of display, this part is ignored. An ending part 706 which indicates that this data stream has ended, and no other parameter information will follow thereafter.

In a field 702 between the starting-up part 701 and the coloration expression image data part 703, and also in a field 704 between the coloration expression image data 703 and the appended annotation part 705, there are contained pieces of information other than the above. For example, pieces of information including parameters for defining physical areas on a display device necessary for drawing an image from now on, such as a screen width, a screen height, a color resolution and the like, are allocated therein. The related information 707 is allocated as it is or after encryption processing in the above-mentioned appended annotation part 705, thereby integrating all of them as one united image information. Thereby, as a result, this image information as the data stream is allowed as a data stream to include the related information and the identifiers therein.

All the above description has been made by way of example using the GIF format, however, it is not limited thereto, and any other formats may be adopted if they are recorded in other fields separated from the image information as shown in the above.

Now, with reference to FIG. 8, another type of format embedding these pieces of information into the image information will be described. FIG. 8 shows another example of the image information embedding the related information. Here, also, the image information thereof is given by way of example of the GIF format image. In this example, also, the format is not limited to the GIF format, and the JPG format or PCX format may be adopted as well.

A starting-up part 801 which is a data field provided to identify that the present information is an image information given in the GIF format likewise the above has a character string of 'GIF' and its version allocated therein. A coloration expression image data part 803 is a part to allocate its image data in which pixels are arranged in the order from the left to the right and from the upper to the lower directions. However, here, it is arranged such that an image information 807 and a related information 808 coexist in a mixed state 809 as indicated by a water mark thereby while allowing the image information to be visible as they are, preventing the related information from being visibly recognized as they are. Here, the information processed to the mixed state 809 described above is encoded using the LZW algorithm of variable code lengths.

An appended annotation part 805 contains the text information other than the image information in the GIF data stream. In this exemplary embodiment of the invention, although this field is not particularly required, it is possible for the information provider to use this data field which may be freely defined if necessity arises. An ending part 806 indicates that this data stream has ended and no other parameter information or the like will follow thereafter.

Although in the example all have used the GIF format, it is not limited thereto, and other image formats may be adopted if the related information is recorded separate from the image information as shown in the above.

Figure 1:
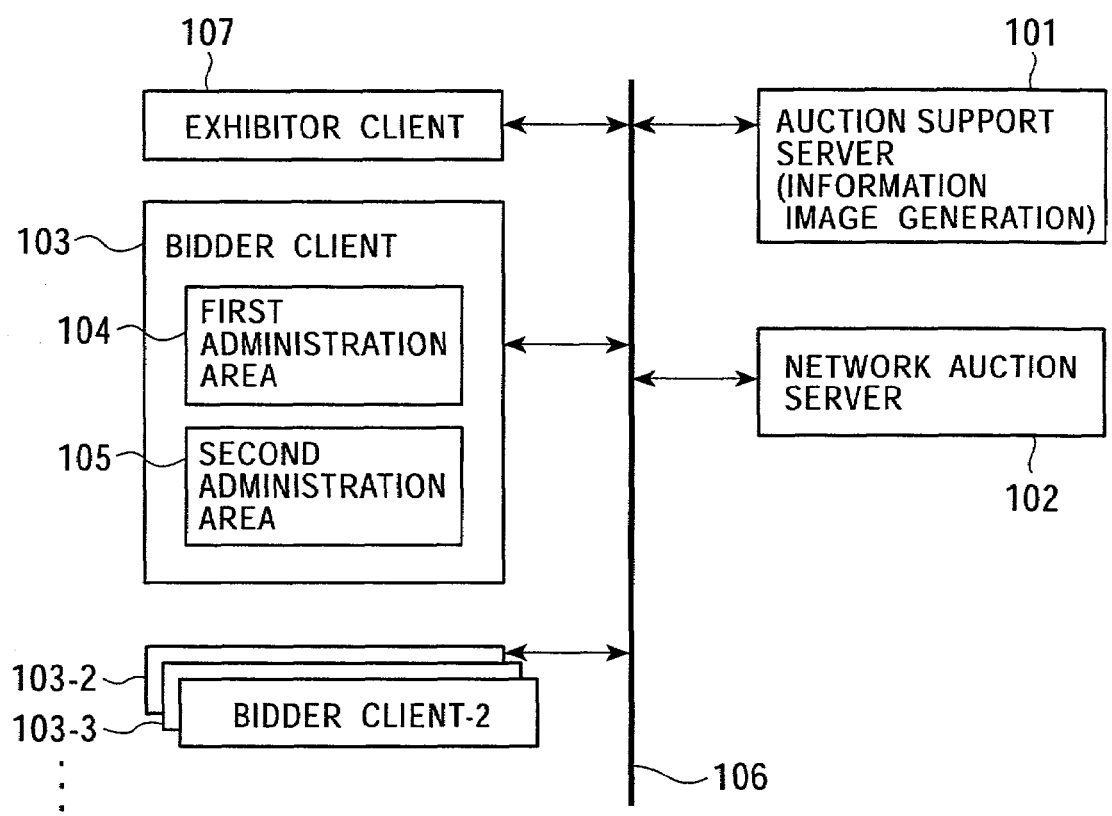
FIG. 1 is a schematic block diagram indicating a system configuration according to a preferred embodiment of the invention.
Figure 2:
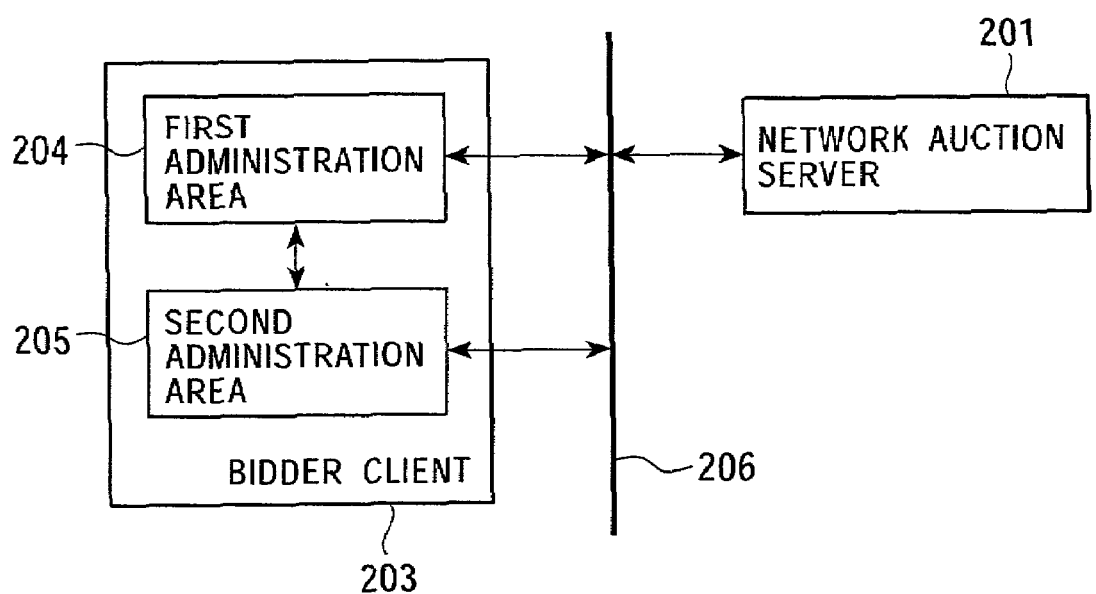
FIG. 2 is a schematic block diagram indicating administration regions implemented in a bidder client.

1.3 Relation Between the Network Auction Server and the Bidder Client:

Now, with reference to FIG. 2, a relationship between the network auction server which constitutes a system infrastructure to use the information image of the invention and the bidder client will be described.

The network auction server 201 which is connected to network 206 is a server for conducting the auction, and is provided, for example, with the following functions.
(a) A function to receive an auction exhibit information from an exhibitor client;
(b) A function to provide the auction exhibit information in response to a request therefor from a bidder client;
(c) A function to accept a bidding offer from a bidder client;
(d) A function to indicate a transaction price in accordance with a procedure of the auction when there are a plurality of bidding offers from a plurality of bidder clients; and
(e) A function to close the bidding procedure when predetermined conditions have been met, to determine pro and con of a prosperous bidder, and when biddable, to decide this bidder selected from the plurality of bidder clients as the winner of the auction.

Here, this auction procedure refers to such a procedure that, for example, if there is only one merchandise item to sell by auction, its sales price is competed among a plurality of bidders who want to buy the item, and one who offers a highest price is decided as a winning bidder. Further, if there are a plurality of merchandise items to sell by auction, it is generally practiced that winning bidders are decided in the order from one who offered a highest price to another one who offered a second highest price and so on, however, the other procedures as follows to determine a winner(s) may be adopted as well depending on rules and procedures preferred by an auction exhibitor or considered appropriate by the auctioneer,
(a) A procedure to determine a bidding price offered by a bidder as its winning price;
(b) A procedure wherein although winning bidders are decided in the order from one who placed a highest bidding price to those who placed lower yet winning prices, all the winning prices are set equal to a lowest winning price.

These are some example of the rules of the auction, and it is not limited thereto, and any other rules may be adopted if it complies with the procedure to determine a few limited number of winners out of the plurality of bidders.

The function to provide the auction exhibit information in response to the request of acquisition thereof from the bidder client is such a function, when an auction exhibit request is made from an auction exhibitor, as to enable for a bidder client to monitor and refer to this exhibit information. For example, if the bidder client uses the Internet Explorer which is a WEB browser of the Micro Software Corp., this function performs as the WEB server which circulates information pertaining to the auction exhibit item in response to a request of acquisition of the information in accordance with the HTTP protocol thereof. At this time, as for the image to be displayed as an auction exhibit item, it is preferable that the above-mentioned information image is used. It is because that a bidding procedure to be performed by the bidder client becomes substantially simplified. A further detailed description will be made in this respect in a chapter of the operation of a preferred embodiment of the invention.

The function to accept the bidding offers described above indicates a function, when a bidder client expresses an intention to buy a particular auction item at a bidding price he/she offers, to accept and record this bidding price offered and the intention of purchase.

The bidder client 203 which is an information display apparatus connected to the network auction server 201 via the network 206 has a first administration region 204 and a second administration region 205 provided operable therein. The first administration region 204 enables to display the image acquired from the network auction server 201, and corresponds, in terms of a graphic image to be explained later, to information provider windows 302, 402 and information provider frame 603. Here, a program of the first administration region functions to display only the image connoted in the information image. The second administration region 205 is controlled such that when a particular image is designated in the first administration region, it registers and displays the contents thereof, and when the operator of the terminal specifies an image displayed here using operating means (not shown), displays at least one related information in response to this operation to activate some action to proceed on the basis of this related information, and if there are a plurality of pieces of the related information, selects one out of them and activate some action to proceed according to this selected information. In terms of the graphic image to be described later, it corresponds to one-touch windows 304, 505, and one-touch frame 602.

By the way, the second administration region and the first administration region in the client are controlled by respective programs. Namely, in the information image pertaining to the image information displayed on the second administration region, the related information connoted therein is interpreted by the program that controls the second administration region so as to enable execution of an operation corresponding to the related information designated by the operator.

1.4 Graphic Image to be Displayed on the Display Terminal:

With reference to FIGS. 3 through 6, examples of graphic images to be displayed to the bidder clients according to the invention will be described.

Figure 3:
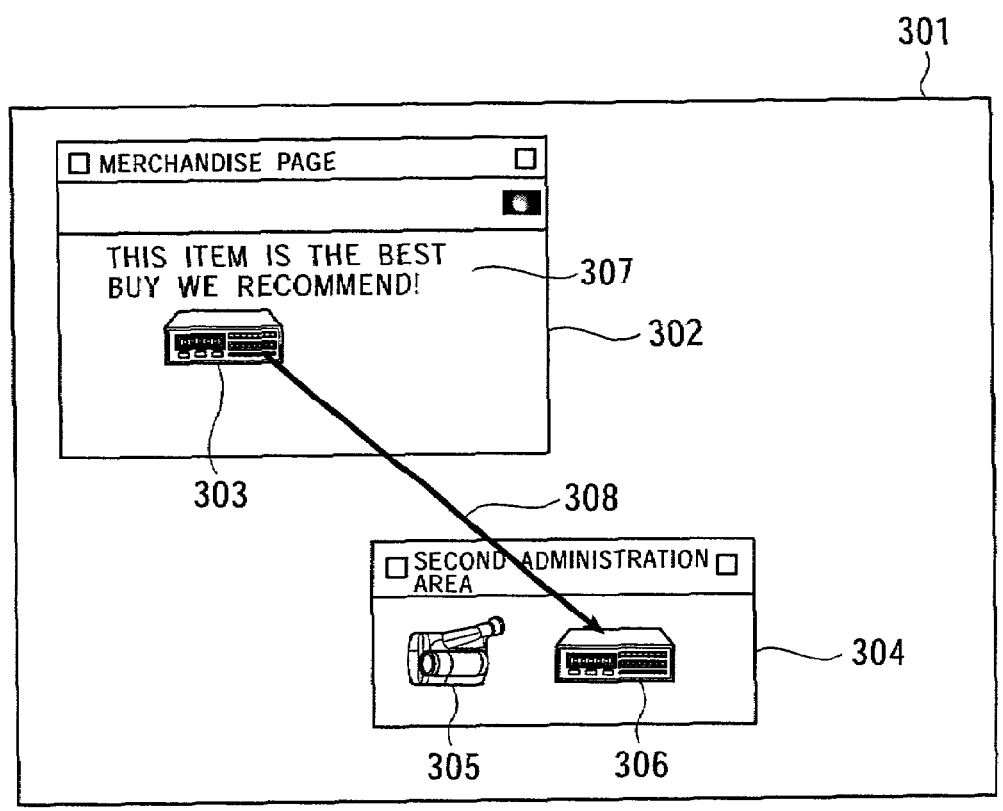
FIG. 3 is a schematic diagram indicating a drag-and-drop operation for registering an information image from a first administration region to a second administration region to be implemented on the side of the client as a precondition according to the invention.

1.4.1 An Example of Graphic Images Suitable for a Computer:

First of all, if a computer having a display/operation terminals supported by an operating system (OS) such as Windows 9x, Windows NT, Windows 2000, Linux and the so on that are capable of supporting an image display is used, it is preferable that a so-called "look and feel" function as shown in FIG. 3 is adopted, which will be described in the following.

A display screen 301 which is a screen or the like of a display device such as a cathode ray tube, a TFT liquid crystal display, or a display incorporated in glasses, functions to display information from the display/operation device for the operator to visually recognize. By the way, on this screen, a border perimeter part of the display screen 301 is indicated to be an outermost frame of this display device, however, this outermost frame part may be displayed inside the display device. A one-touch window 304 which is a window for displaying at least images 305, 306 (or image information such as photographs), and when the operator of the terminal of this information display apparatus designates the image 305 using operating means which is not shown, at least one related information associated therewith is displayed to prompt actuation of some processing in accordance with this related information, while on the other hand when there are plurality thereof, it is enabled to select to actuate some processing in accordance with the information selected. Namely, this one-touch window 304 functions as a special administration region (the second administration region) to help guide to a special operation using images 305, 306 as a clue or hint on this display screen 301, thereby allowing for the operator of the terminal to realize a new operation or function using the image displayed within this region as the clue. If a mouse is provided here as the operating means, preferably the right-hand click button is depressed to enable a pop-up menu to appear and to display the related information thereon, and when this related information includes a plurality of pieces of information, the left-hand click button is pressed to designate one of them. Information provider window 302 is a frame for displaying at least image 303 and the like. When the operator of the information display apparatus of the invention designates the image displayed within this frame using the operating means which is not shown, it is enabled to add and register a new image according to this operation into the one-touch window 304. By the way, the image to be added to the one-touch window 304 may be exactly the same one as is displayed in the information provider window 302 and designated therein or may be replaced with another image if necessary. The information provider window 302 may also display character information 307 or the like in addition to the image.

That is, this information provider window 302 functions as the administration region (the first administration region) for arousing interest in the operator of the terminal by displaying images and so on, and also for prompting registration into the one-touch window 304 of the image designated by the operator of the terminal.

By way of example, as to the designation operation by the operator of the display/operation terminals, if a pointing device such as a mouse is provided as the operating means, preferably a so-called "drag-and-drop" user interface technique (308) is used whereby an image desired to be registered is designated with this pointer, dragged onto the one-touch frame 302, and dropped thereon. If this user interface is used, and, for example, the Internet Explorer or the Netscape Navigator is used for the information provider window 302, it is advantageous because the same operating feel as by any other window programs can be realized.

Figure 4:
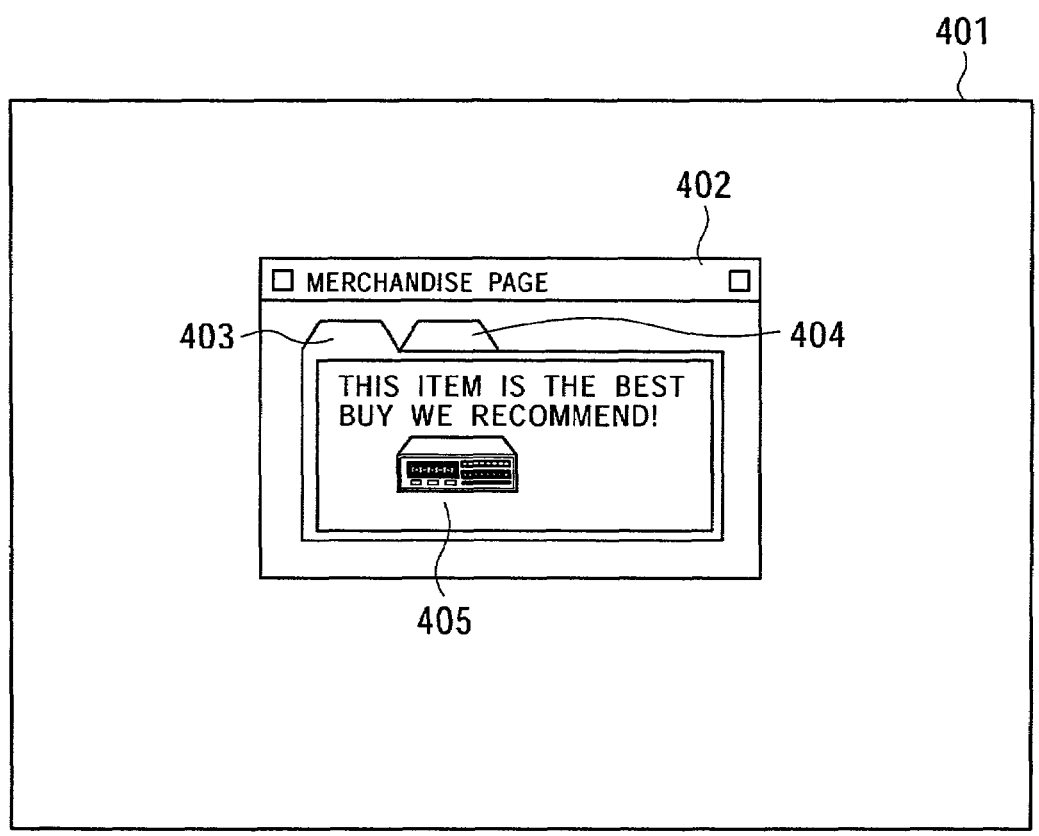
FIG. 4 is a schematic diagram indicating another example for registering the information image from the first administration region to the second administration region to be implemented in the client as the precondition of the invention.
Figure 5:
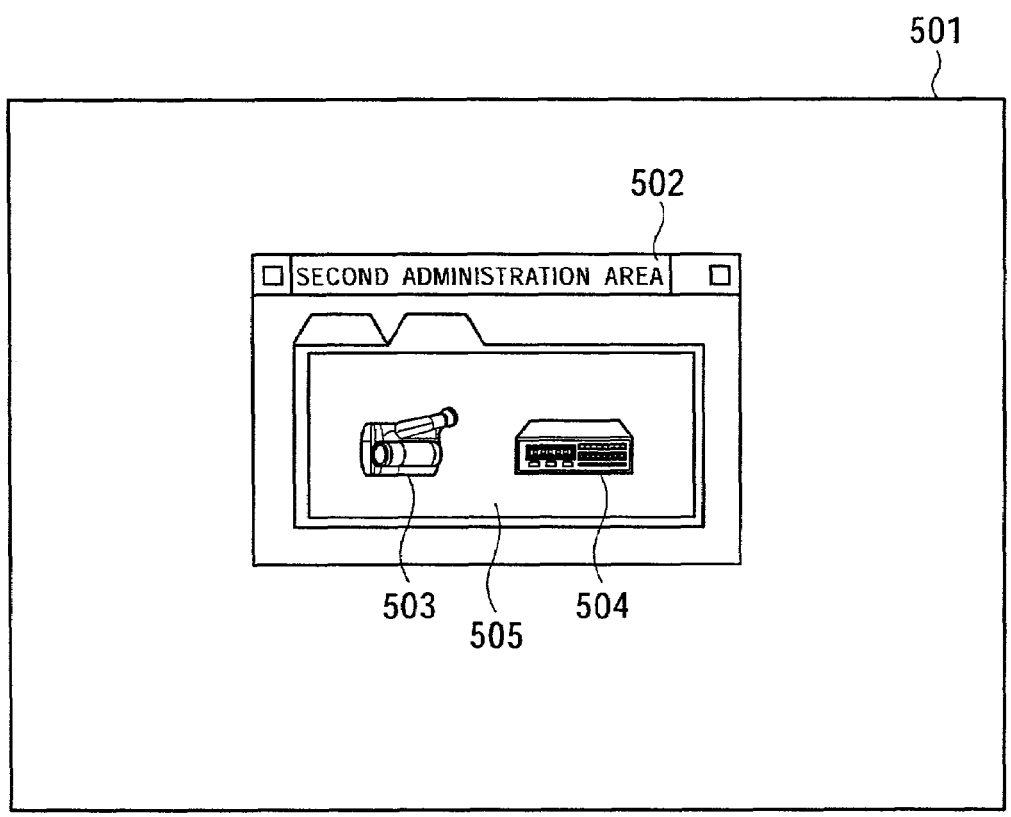
FIG. 5 is a schematic diagram indicating still another example for registering the information image from the first administration region to the second administration region to be implemented on the side of the client as the precondition according to the invention.

1.4.2 Another Example of Graphic Images Suitable for the Computer:

Windows as shown in FIGS. 4 and 5 may be used as other examples of the interface as well.

The display screens 401, 501 function as a display screen or the like for displaying information from a display device such as a cathode ray tube, a thin film transistor (TFT) liquid crystal display, or a glass incorporated display so as to allow for the operator to visually recognize the information displayed. The information display/registration window 402 functions as a man-machine interface to allow for the operator to display the image supplied from the information provider and carry out registration thereof. An information provide tab 403 is an interface element for selecting an administration region provided within the area of the registration window 402, and when this tab is activated, the image sent from the information provider is displayed in the first administration region 405. Then, when the operator of this information display apparatus designates a particular image displayed in the first administration region using an operating means which is not shown, the image according to this operation is newly added onto a second administration region which is displayed when a one-touch tab 404 is activated.

The one-touch tab 404 is an interface tab element for selecting an administration region provided within the area of information display/registration window 402. When this tab is activated, a second administration region 505 is displayed, in which the image having been designated for registration by the operator in the first administration region 405 is created as a new image. Then, when the operator of the terminal of the information display apparatus designates a particular image displayed in the second administration region using an operating means which is not shown, it is enabled that at least one related information is displayed in accordance with this operation and some processing based on this related information is started, and when there are a plurality of related information, an appropriate related information is selected, and some processing is started based thereon. Namely, this second administration region 505 on the information display/registration window 502 functions as a manager region (the second administration region) for guiding to a particular operation using images 503 and 504 as a clue or a hint, thereby allowing for the operator of the terminal to realize a new operation using the images displayed in this region as the clue.

When this user interface is used, it is advantageous in such instances where an area of the display screens 404, 501 is narrow, or a resolution of the screen is low, because the operation of the information display/registration can be accomplished in a limited display area.

Figure 6:
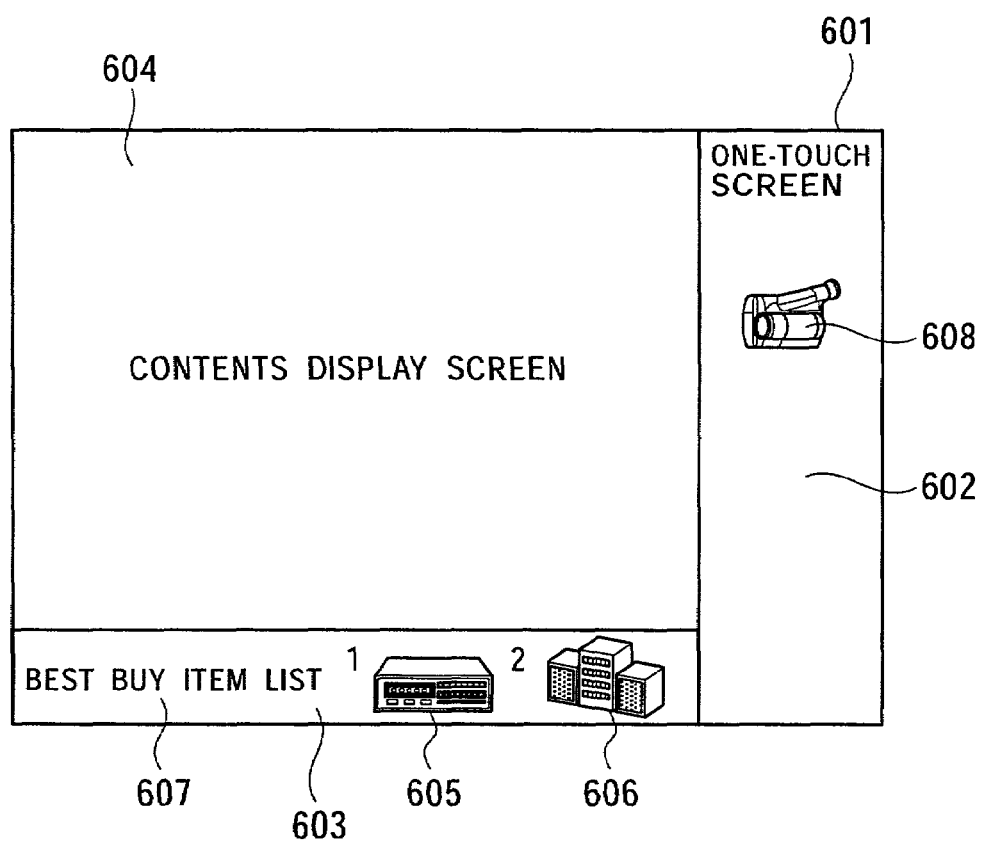
FIG. 6 is a diagram indicating a layout of the first and the second administration regions to be realized on a relatively narrow display area of a client such as a PDA.

1.4.3 Another Example of Graphic Image Suitable for a Digital TV or PDA:

In the case of using the information image for a digital TV or a portable terminal of a personal data assistance (PDA), preferably a "look-and-feel" window as shown in FIG. 6 is advantageous, which will be described in the following.

A display screen 601 functions as a display screen or the like of display devices such as a cathode ray tube screen, a TFT liquid crystal display screen, glass-incorporated display and so on for allowing the operator visually to recognize information supplied from the display apparatus. Also in this figure, although a border perimeter of the display screen 601 is drawn to be an outermost frame of the display device, the outermost frame may be displayed within the display device.

One-touch frame 602 which functions likewise the one-touch window described above is a frame which displays at least an image 608. When the operator of the terminal of the information display apparatus designates this image 608 using an operating means which is not shown, it is enabled such that at least one related information is displayed, and some processing based on this related information is activated, on the other hand, where there are plurality of related information, it is enabled such that selection from the plurality of related information is made, and some processing based on this selected related information is activated. Namely, this one-touch frame 602 functions on the display screen 601 as a special administration area to guide to a special operation using the image 608 as its clue thereby allowing the operator of the terminal to realize a new operation using the image displayed therein as the clue.

The information provider frame 603 which functions likewise the information provider window described above is a frame which displays at least images 605, 606 or the like. When the operator of the terminal of the information display apparatus of the invention designates a particular image displayed in this frame using operating means which is not shown, it is enabled that a new image is added to the one-touch frame 602 in accordance with this operation.

By the way, the image to be added here may be the same image that is displayed and designated in the information provider frame 603 as it is, or may be replaced with another image as required. In addition to the images, the information provider frame 603 may display character information 607 and the like. Namely, this information provider frame 603 functions on the display screen 601 as the special manager region (the first administration region) which displays images and so on to arouse interest in the operator of the terminal, and which guides to registration on the one-touch frame 602 of the image which is designated by the operation of the operator of the terminal.

By the way, as to the special operation and the registration on the one-touch frame by the operator of the terminal, if a pointing device such as a mouse is provided to the operating means, a user interface technique of the so-called drag-and-drop process may be used whereby an image which is desired to be registered is designated with the pointer, dragged onto the one-touch frame 602, and dropped thereon for registration. Contents display screen 604 which is a frame for displaying contents, for example, of a movie in a digital broadcasting is an area used for displaying information the operator of the terminal want to view. By the way, the contents of information is not limited to the movie, and it may include a still image, a text in a character broadcasting and any other types of information that stimulates human visions to communicate information.

1.5 Communication Between the First and the Second Administration Regions:

Communication of the related information and the like is performed between the first and the second administration regions. In order to realize the communication therebetween, an inter process or an inter thread communications are used. As for realization of the inter process/inter thread communications, there are various methods that can be selected. For example, there is such one that a common control unit which controls two different regions achieves communication therebetween by utilizing a common memory space. It is also possible to execute a data communication between the first and the second administration regions after creating a new separate process and establishing communication with this process based on the COM technology.

2. Preferred Embodiment of the Invention 2.1 System Configuration Embodying the Invention A schematic system configuration according to a preferred embodiment of the invention will be described with reference to FIG. 1.

The system of the present invention is constructed such that the network auction server 102 conducts auction supported by the auction support server 101. The auction support server 101 which is connected to network 106 is allowed to communicate with bidder clients 103, 103-2, 103-3, and with the network auction server 102. Then, the auction support server 101 receives a notification of an ongoing auction situation from the network auction server 102, and when there arises a change in the current situation of the auction, notifies the bidder clients of the change thereof.

Further, the auction support server 101 is enabled to prompt an input of information pertaining to an auction exhibit item by an auction exhibitor client 107, and also to notify contents of the information to the network auction server 102. Details thereof will be described later. The network auction server 102 likewise the network auction server 201 connected to the network 206 described with reference to FIG. 2 is a server connected to the network 106 for executing the auction, and is comprised, for example, of functions: to receive an exhibit information from an exhibitor client; to provide the exhibit information in response to a request of acquisition of an image information to a bidder client; to accept a bidding offer from the bidder client; if there are a plurality of bidding offers from a plurality of bidder clients, to indicate a current update price raised by competition in accordance with a procedure of the auction; and when predetermined conditions are met, to close the auction, decide pro and con, and if biddable, determine a winning bidder among them.

Here, as for the function to accept the exhibit information, either cases will do to accept an exhibit application directly from an auction exhibitor client or to accept the exhibit application indirectly from the auction exhibitor client 107 via the auction support server 101.

The auction exhibitor client 107 which is connected to the network 106 is allowed to download an information page on the auction inviting to participate in the auction from the auction support server 101 or from the network auction server 102, and to send information pertaining to an auction exhibit item they want to sell by auction in accordance with the auction information downloaded. More particularly, this function can be realized, for example, with a computer which is connected to the internet, controlled by an operating system such as Window 2000, and installing Internet Explorer as a browser.

The bidder client 103 which is connected to the network 106 is allowed for the operator thereof to submit an intention to buy an auction exhibit item at a price they offer to the network auction server 102. By the way, as for the bidder client, it is not limited to one client, but it is common that there exist a plurality of bidder clients 103-2, 103-3 and so on. This bidder client will be described more specifically later.

Figure 17:
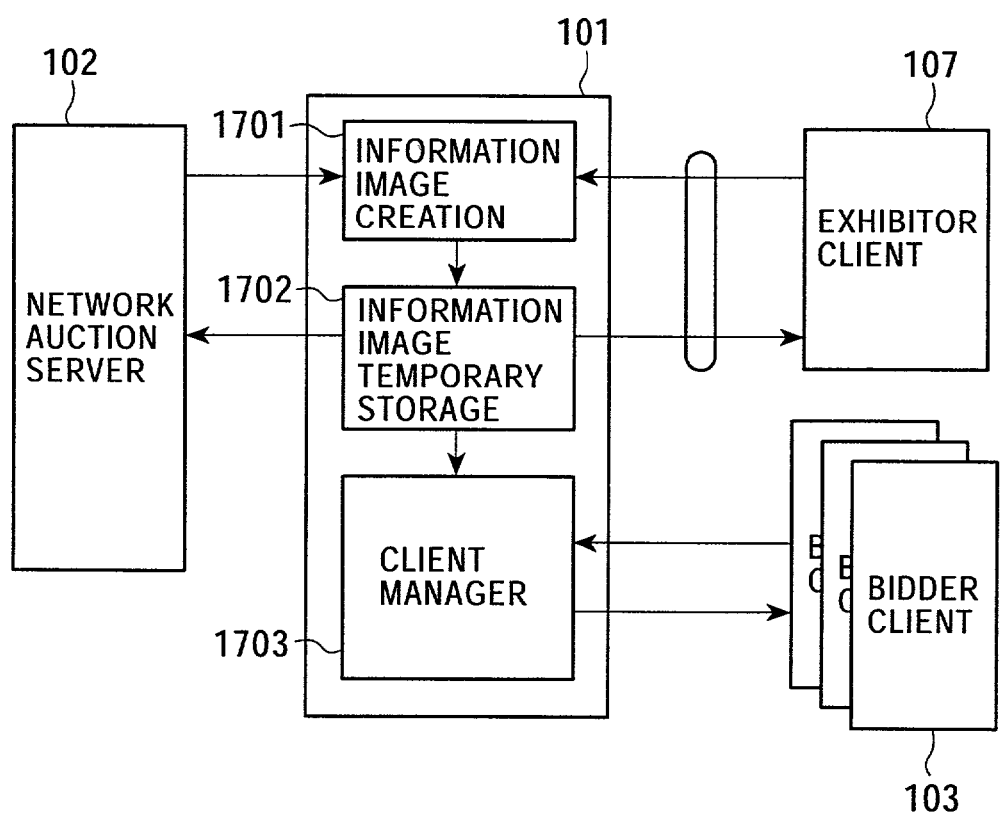
FIG. 17 is a schematic diagram indicating a configuration of an auction support server embodying the invention.

2.2 Configuration of the Auction Support Server:

With reference to FIG. 17, the auction support server will be described more specifically in the following. FIG. 17 describes more specifically the configuration of a part of the auction support server 101 in the system shown in FIG. 1.

An information image creation part 1701 is connected via the internet to an auction exhibitor client 107 and the network auction server 102, thereby communicating therewith to receive an information image, an image information, a related information and the like, and thereby creating a new information image containing all of them. An information image temporary storage part 1702 stores temporarily an information image created in the information image creation part so as to be able to correspond to a processing thereafter. As will be described later, when the information image is transferred from the first administration region to the second administration region in the bidder client 103, a notification thereof is issued. Upon notification thereof, a client manager part 1703 records identification ID of this bidder client associated with this information image notified. Then, when there arises a request to send thereof from the network auction server 102 or from the bidder client 103, the auction support server sends the information image using the identification ID recorded as a clue so as to enable the information image to be displayed in the second administration region in the bidder client.

Figure 9:
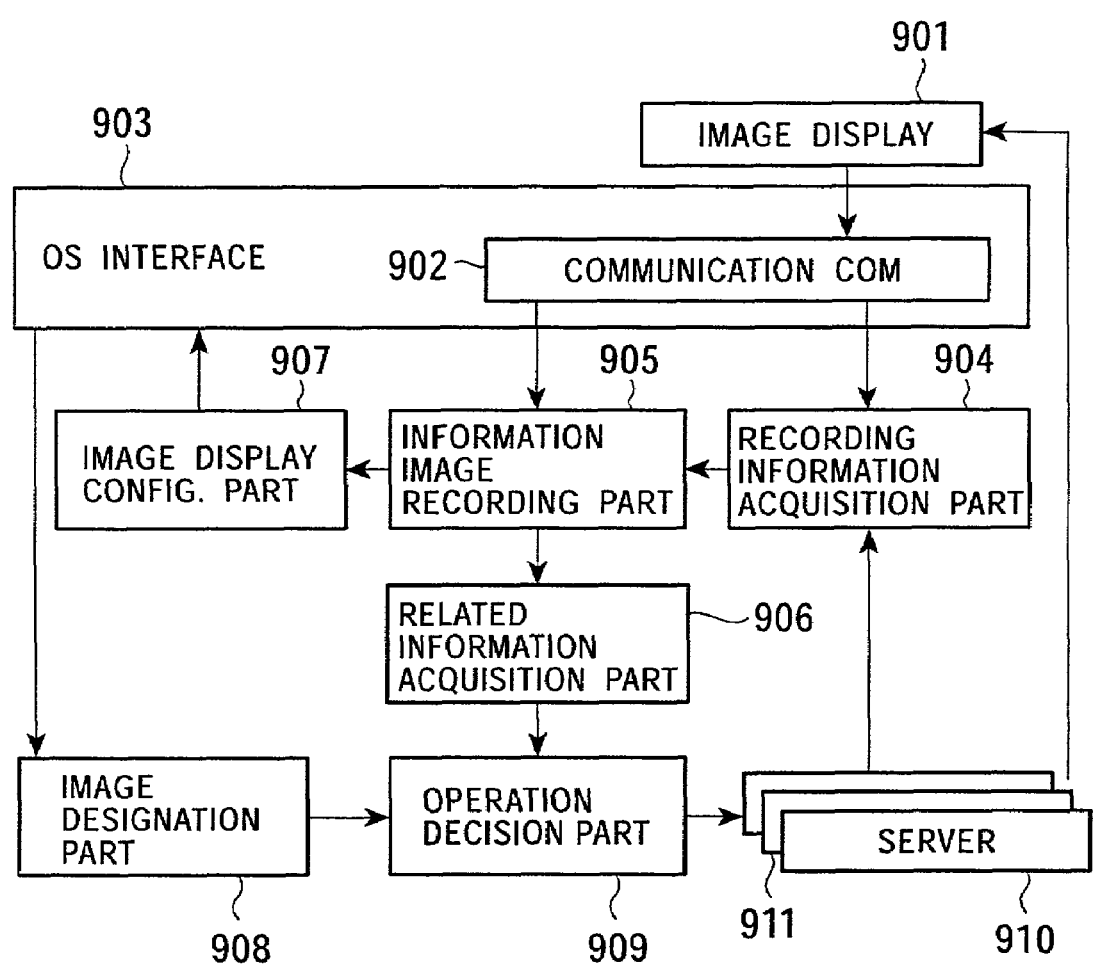
FIG. 9 is a schematic diagram indicating a configuration of a bidder client according to an embodiment of the invention.

2.3 Bidder Client:

As to the bidder client, if the Windows of Microsoft Corp. is used as its OS and the Internet Explorer is used for controlling the first administration region, the first and the second administration regions as well as communication therebetween can be realized by constructing its client configuration as shown in FIG. 9.

2.3.1 Configuration of the Bidder Client:

The configuration of the bidder client will be described with Reference to FIG. 9.

The image display part 901 is, for example, the Internet Explorer of Microsoft Corp., and when an instruction is issued from the operator to download information from a particular server, in response to this instruction, a logical connection to the server 910 is established via the network enabling to obtain and display this information in the first administration region. Further, the second administration region is comprised of, for example, a record information acquisition part 904, an information/image recording part 905, a related information acquisition part 906, an image display composing part 907, an image designation part 908 and an operation decision part 909.

A communication COM 902 which is a means for establishing inter-process (or inter-thread) communications utilizing a component object model (COM) which is a function of the operating system (OS) is enabled to realize transmission of information from the process dragged to the process dropped if there occurs a user interface operation such as the drag-and-drop operation.

The record information acquisition part 904 which is connected to the network is arranged to receive the information image from the server 910 and transfer the same to the information image recording part 905 in a next stage. The information image recording part 905 is designed to record the information image integrating as the single handling unit the image information and the related information which is notified from the communication COM 902 or the recording information acquisition part 904 . By the way, it may be arranged to the same effect of the invention such that the image information and the related information are not integrated into the information image but are recorded separately in different memories as correlated therebetween. Further, when there occurs a registration operation of the information image in the second administration region, for example, by the drag-and-drop operation from the first to the second administration regions, the information image recording part 905 notifies the concerned server via the related information acquisition part 906 that the information image has been registered in the second administration region. The related information acquisition part 906 is connected to the information image recording part 905 and is arranged to obtain only the part of the related information from the information image which is recorded in the information image recording part 905. The image display composer part 907 is connected to the information image recording part 905, and is arranged to display all or selectively the information image recorded in the information image recording part 905 as a display from the second administration region. Namely, it enables the operator to visually percept an image pertaining to the information image via the one-touch frame (one-touch window). An image designation part 908, by the function of the OS interface 903, when the operator designates an image displayed in the second administration region, identifies information image corresponding to this image. The operation determination part 909 is connected to the image designation part 908 and the related information acquisition part 906, and is arranged to operate in accordance with the related information included in the information image which was designated by the operator.

2.3.2 Example of Operations by the Bidder Client:

An exemplary operation by the bidder client in the client configuration as shown in FIG. 9 will be described in the following.

The operator of the bidder client will acquire information pertaining to the auction exhibit items which are biddable from the auction server 910 and display the same on the image display part 901. At this time, if the image display part uses the Internet Explorer, the operator will proceed to display a web page of the auction site via http protocol.

Then, when the operator of the bidder client recognizes a biddable auction exhibit item by browsing displayed images, the operator may conduct a transfer operation to move this image to the second administration region such as by the drag-and-drop operation. At this time, because the image to be dragged and dropped is the information image, it will be recorded in the information image recording part 905 via the communication COM 902. Concurrently, by the action of the related information acquisition part 906 and via the operation determination part 909, auction support server 911 will be notified that this information image has been registered in the second administration region.

On the other hand, the information image pertaining to the second administration region and recorded in the information image recording part 905, through action of the image display composer part 907, will be displayed to the operator of the bidder client via the OS interface 903. Then, when the operator of the bidder client performs operation in accordance with the related information which is recorded in the information image displayed, the operator is allowed to perform the operation pertaining to the related information through action of the image designation part 908 and the operation determination part 909. For example, if an operation program for performing bidding to the network auction server 910 is recorded as this related information, the operator is allowed to perform the bidding through the operation thereof and offer a bidding price with respect to an auction exhibit item pertaining to this information image. Further, if a URL of the network auction server is contained as the related information, a home page pertaining to this URL may be opened for urging the bidding. Further, when an instruction to update the information image displayed on the second administration region is issued from the auction support server 910, because a notification accompanying the information image for updating is given to the recording information acquisition part 904, through operation thereof, the information image recorded in the information image recording part 905 is updated, or added to with a new one.

Figure 10:
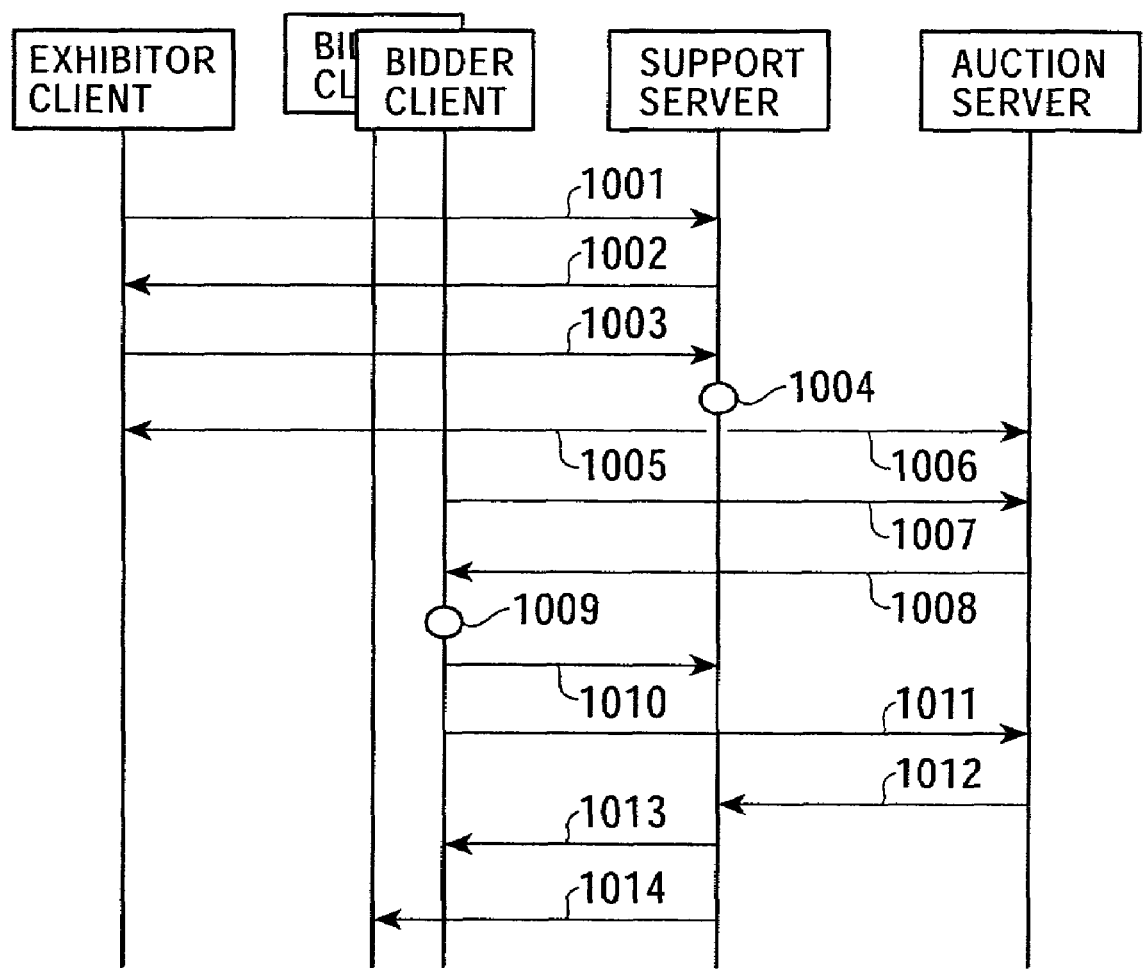
FIG. 10 is a flowchart indicating information flows according to the embodiment of the invention.

2.4 System Operation According to the Invention:

With reference to FIGS. 10 through 14, a system operation embodying the invention will be described. FIG. 10 is a flowchart indicating flows of information, in particular, between respective parts in the system shown in FIG. 1.

At first, the operator of the exhibitor client request to the auction support server a registration page for registering information pertaining to an exhibit item the exhibitor client wants to sell by auction (1001).

Then, in response to this request, the auction support server sends a registration form information to the exhibitor client inviting to participate in and register (1002). An example of a home page indicating this registration form is shown in FIG. 11. In order to register an auction exhibit item to the auction, a descriptive information explaining what its exhibit item is and what features it has is required to be known. In this example, there are displayed various parts as follows: an image file designation block 1101 for selecting and uploading image files on the exhibitor client; a text indication block 1102 for inputting a text explaining the features of the exhibit item; a minimum bidding price indication block 1103 indicating a minimum bidding price the exhibitor client wants to sell by auction; and an auction site selection block 1104 for selecting an auction site the exhibitor client wants to participate in. The operator of the exhibitor client fills in required items on this form, then clicks a temporary registration button 1105. At this instant, the exhibitor client is enabled to send contents of the information filled in the form to the auction support server (1003). By the way, transmission of the image files will be described more specifically later.

Next, the auction support server creates an information image based on the information thus obtained through action of the information image creation part 1701 (1004). Here, preferably, the information image uses the image file pertaining to the auction exhibit item which is uploaded as the image information, and also in order for a registered bidder client who wants to place a bidding offer to this auction exhibit item to be able easily to establish communication with the auction server engaged in this auction, preferably, the related information contains a connection information for enabling to connect to the auction server that is selected in the auction site selection block, or a bidding program operable with the auction server.

Figure 12:
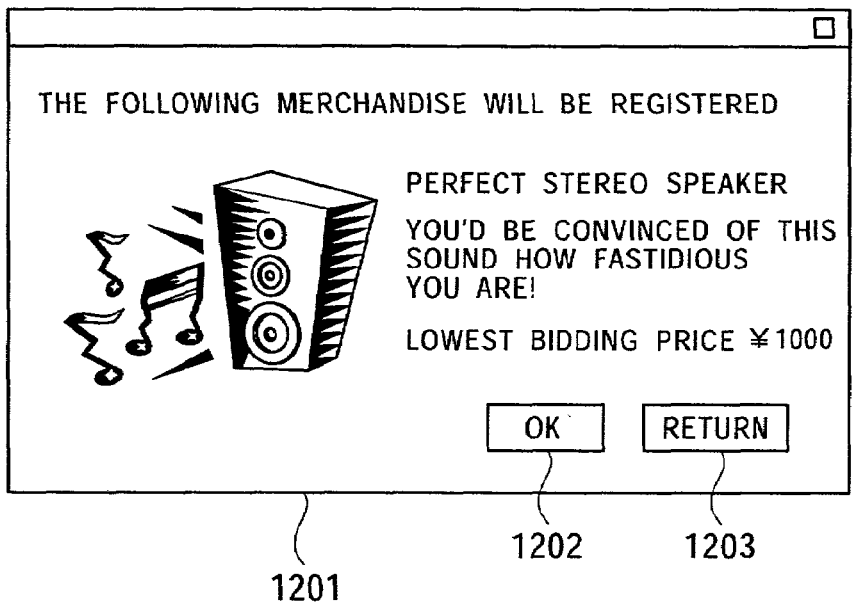
FIG. 12 is an example of display for confirmation of the auction registration according to the invention.

At this time, it is also possible to confirm the registration of the exhibit item to sell by auction. In this case, it is implemented by sending a confirmation page 1201 as shown in FIG. 12 from the auction support server to the exhibitor client, and by that a registration button 1202 to approve a continuation of registration and a return button 1203 to instruct to return to a previous step are included in this page.

Figure 13:
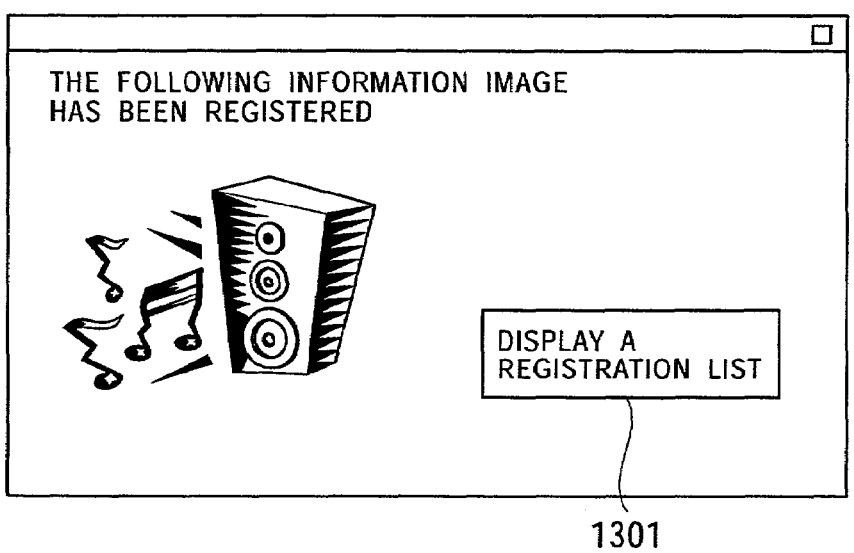
FIG. 13 shows an example of a home page indicating completion of registration according to the invention.
Figure 15:
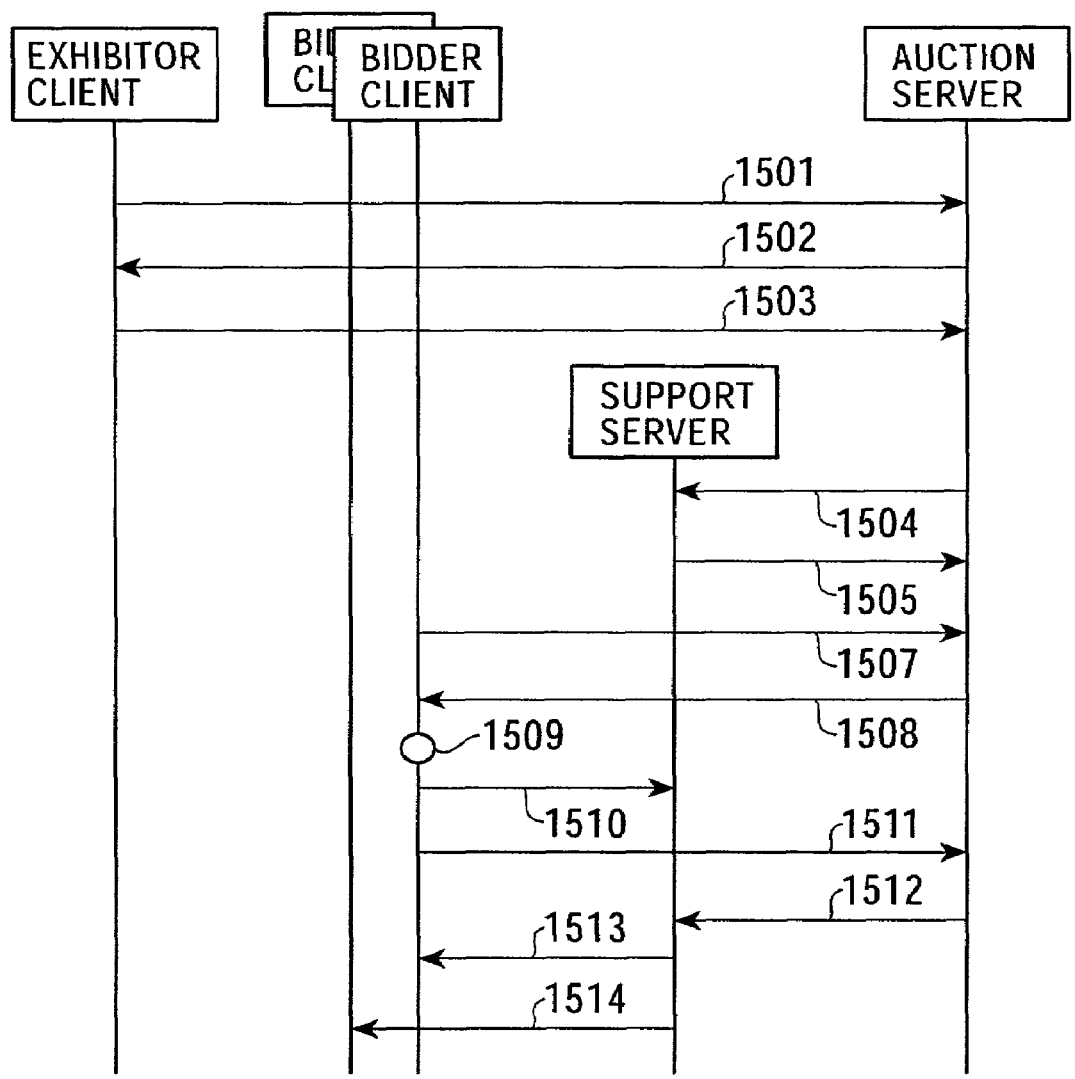
FIG. 15 shows a flowchart indicating information flows according to a modified version of the invention.

When the auction exhibit item to sell by auction is finally verified in the auction support server, this information is sent to the auction server that is selected in the auction site selection block (1006). Further, preferably, a page format as shown in FIG. 13 indicating that the registration has been completed is displayed to the exhibitor client at the same time (1005).

When the registration is completed as described above, because it can monitor and supervise this exhibit item, the auction server is enabled to put this exhibit item on its home page for sale by auction.

When a request for the information pertaining to the auction exhibit items that are uploaded for sales by auction is issued from the bidder client who wants to know (1007), this information is downloaded to the bidder client in response to this request so as to display the auction exhibit item list (1008).

In the bidder client, this auction exhibit item list is displayed on its first administration region. Then, if there is any item the bidder client is interested in among the auction exhibit items displayed as an image, this item is dragged from the first administration region and dropped in the second administration region for registration thereof (1009). At this time, through the registration operation in the second administration region, it is notified to the auction support server that there has been a registration (1010). Then, through operation of a client manager part 1703 in the auction support server, it is recognized that this bidder client is interested in this auction exhibit item, and this fact is recorded.

In the next, when the operator of the bidder client desires to place a bidding offer with respect to an auction exhibit item pertaining to the information image which is under control of the second administration region, the operator of the bidder client is urged to designate the same in accordance with its related information contained in the information image in the second administration region. Then, upon designation thereof, through actions of the image designation part 908, the operation determination part 909 and the like, it is allowed for the bidder client to issue a bidding request to the auction server (1011). At this time, it may be arranged such that this bidding request is connected once to the home page in the auction server containing the bidding form for downloading the same, then after filling in the bidding form, the bidding request is uplinked. Still further, depending on the construction of the related information, it is also possible for the connection to the auction server (1011) to be executed with an identification ID of this bidder client superimposed at the same time upon designation of this information image. Thereby, without the need of downloading the bidding form per request, the bidding becomes possible thereby enabling a rapid auction handling.

When a transaction price and the like changes on the auction server by this bidding and so on, this information is notified to the auction support server together with an identification of this auction exhibit item (1012). Then, the support server creates an update information image including this new transaction price through the action of the information image creation part 1701, notifies the client manager part via the information image temporary storage part 702, and transmits the updated information image to the bidder clients who are registered regarding this auction exhibit item and recorded in the auction support server 101. Thereby, it is enabled for all bidder clients who have registered therein to be notified of the updated transaction price of the auction exhibit item substantially in real-time from the auction support server when the information image pertaining to the auction exhibit item is dragged to the second administration region (1013, 1014).

2.5 Modification 1:

The preferred embodiment of the invention described hereinabove has been set forth by way of example of the system configuration in which the exhibitor clients have converted exhibit items they want to sell by auction into the information image in advance before registering to the network auction server, however, it is not limited thereto, and it may be arranged to the same effect of the invention such that the conversion into the information image may be executed not by the exhibit clients but by the auction support server upon a request of the conversion from the network auction server after reception of the auction exhibit items to the network auction server. An information flowchart in this instance will be described with reference to FIG. 15.

By the way, in this case there is no major difference in its system configuration compared with the preceding system configuration of the invention except for some changes in connections between respective clients or the servers and their operations.

At first, the operator of the exhibitor client request a format page of the auction to the network auction server necessary for registering an auction exhibit item the exhibitor client wants to sell by auction (1501).

Figure 16:
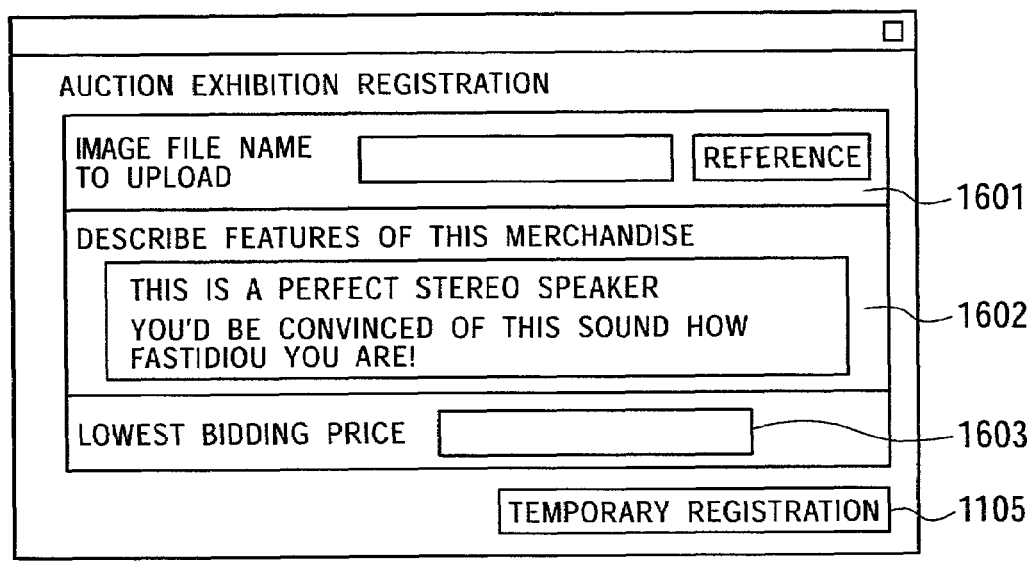
FIG. 16 is an example of display indicating a registration form for the auction exhibitor client according to a modified version of the embodiment of the invention.

Then, in response to this request, the network auction server sends the registration form information for registering the exhibit item to the exhibitor client (1502). An example of forms of this registration page is shown in FIG. 16. In order to validate the registration of the auction exhibit item, some more information describing what the exhibit item and what its features are is required. Therefore, it is arranged such that an image file designation part 1101 for selecting an image file on the exhibitor client which can be uploaded is displayed, a text description part 1102 for describing the feature of the exhibit item is displayed, and a minimum bidding price designation part 1103 for indicating a lowest bidding price the exhibitor client may sell by auction is displayed. The operator of the exhibitor client, after filling in required items on this form, clicks a temporary registration button 1105. Through this operation, the exhibitor client is allowed to send contents of information filled in on the registration form to the auction support server (1503).

While in the preceding embodiment of the invention described above there was displayed the auction site selection part, this part is not displayed in this modification of the embodiment of the invention. This is because that the exhibitor client is already connected to the network auction server the exhibitor client preferred thereby omitting the necessity of selection.

Subsequently, the network auction server requests the auction support server to create information image (1504). The auction support server, through action of the information image creation part 1701, creates the information image, and returns this information image thus obtained to the network auction server (1505). Here, preferably, the information image uses the image file pertaining to the auction exhibit item which was uploaded as its image information, and at the same time contains as its related information a connectivity information to connect with the auction server which was selected in the auction site selection part so as to enable the bidder client participating in the auction of the exhibit item simply and easily to establish communication with the auction server engaged in this auction. The information image thus created can be put up on the home page publicizing its sales by auction.

If a request of this information is requested from the bidder client who wants to know what items are listed for sales by auction (1507), in response to this request, this information is forwarded to the bidder client for them to display this auction exhibit list (1508).

In the bidder client, this auction exhibit item list is displayed in the first administration region thereof. Then, if there is any item the bidder client is interested in among the auction exhibit items displayed as images, the bidder client registers this exhibit item of the image in the second administration region by the drag-and-drop operation (1509). At this time, this event of the registration operation in the second administration region is notified to the auction support server (1510). Then, by action of the client manager 1703 within the auction support server, the fact is recognized that this bidder client is interested in this particular auction exhibit item, and is recorded accordingly.

Then, when the operator of the bidder client wants to submit a bidding offer with respect to the auction exhibit item pertaining to the information image under control of the second administration region, the operator is urged to designate this item in accordance with the related information contained in the information image within the second administration region. Then, through actions of the image designation part 908, the operation determination part 909 and the like, the bidder client is allowed to submit a bidding request to the auction server (1511). At this time, it may be arranged also such that this bidding request is connected once to the home page in the auction server which contains the bidding form downloadable to the requester to fill in, and then the contents of information filled in by the requester are uploaded. Further, depending on the configurations of the related information, it is also possible for the connection to the auction server (1511) to be established upon the designation of the information image of interest with an identification ID of this bidder client being superimposed. By this arrangement, the bidding activity is enabled without the need of downloading the bidding form per request, thereby facilitating a speedy auction procedure.

By this bidding and so on, when the transaction price changes on the auction server, the auction support server is notified of this change attached with information specifying this auction exhibit item (1512). Then, the support server, by the action of the information image creation part 1701, creates an update information image which contains the new transaction price, notifies to the client manager part via the information image temporary storage part 1702, and circulates the updated information image to the bidder clients who have registered as to this auction exhibit item and are recorded in the auction support server 101. Thereby, by a drag-and-drop operation to move the information image pertaining to the auction item to the second administration region, all the bidder clients who have registered are ensured to be notified of the new transaction information pertaining to the exhibit item substantially in real time (1513, 1514).

2.6 Modification 2:

In the description hereinabove, the auction support server and the network auction server have been set forth as separate and independent servers, however, it is not limited thereto, and the feature of the invention can be implemented also with a single integrated server only if their functions are separated accordingly.

2.7 Modification 3:

By use of the system embodying the invention described hereinabove, a procedure of settlement of accounts after closing of the bidding session can be accomplished easily. This will be described with reference to FIGS. 9 and 17.

For this purpose, when installing in advance the program for controlling the second administration region into a computer of the bidder client, preferably it is arranged such that bank account numbers or the like are enabled to be registered afterward, and that this registered information is recorded in the auction support server.

On the other hand, at the time of submitting bidding information from the bidder client to the auction server (1011), preferably it is arranged such that an identification information of the second administration region in the bidder client is contained in this bidding information to submit to the network auction server, and the network auction server records this ID information together with the bidding information. Then, the network auction server after it determines this bidder client as a winning bidder makes inquiry to the auction support server using this ID information of the second administration region pertaining to this winning bidder as to its bank account, thereby ensuring to settle payments from this bank account. According to the same procedure, because the bank account of the exhibitor client can be recognized, it is also possible to settle payment with the exhibitor client.

3. Up-link of the Image:

In the communication from the exhibitor client to the auction support server or to the network auction server, a file transfer is accompanied. A function to upload a file from the client side using the web browser is defined in the "Request For Comments (RFC) 1867", therefore, this function can be achieved using the same. For example, in the case where the server is constructed using IIS 5.0 implemented on Windows 2000 of Microsoft Corp., the "Posting Acceptor" thereof may be implemented to carry out the up-link.

When the Posting Acceptor is implemented on the server, a file "cpshost.dll" is registered in the server, and functions as "ISAPI" (Internet Server Application Program Interface) of IIS 5.0. When a user browser operating as the client casts the "FORM" to this ISAPI, the upload of the file is enabled.

More specifically, it is enabled by designating the directory to upload into this form on the page for starting the registration, and by configuring the form with "cpshost.dll" as its target file. An example of essential parts of this program is indicated in FIG. 14.

In a form tag 1401, there is contained a concealed variable 1404 which indicates where the file having been designated on this page should be placed in the server. Further, an INPUT tag which indicates to select a file name to be uploaded from files recorded in the client's computer is described as to the image file and the related information file, respectively (1402, 1403).

If these descriptions are implemented in the HTML file, it is enabled to transfer the file from the client to the server via the Posting Acceptor.

According to the invention described hereinabove, if the transaction price or the like on the network auction server changes, this information is notified speedily to those who are interested in the auction or who have participated in the bidding, therefore, the efficiency of the auction can be improved substantially.

All or some of the above described embodiments may also be combined. While the invention has been particularly shown and described with reference to the preferred embodiments thereof, it will be understood by those skilled in the art that the foregoing and other changes in form and details can be made therein without departing from the scope of the invention.

What is claimed is:

1. A method of conducting a network auction comprising the steps of:
displaying information pertaining to an auction exhibit item which is registered in a network auction server to a bidder client;
recording an identification (ID) code of said bidder client when said bidder client requests a notification of the information pertaining to said auction exhibit item, wherein the identification (ID) code identifies an address of the bidder client; and
notifying an updated transaction price to the address of the bidder client having said identification (ID) code automatically when a transaction price changes due to a bid submitted by another bidder client,
remotely updating the notification using an information image that is generated by said network auction server and downloaded by said bidder client.

2. A method of conducting a network auction comprising the steps of:
creating an information image, which combines an image information pertaining to an auction exhibit item and a related information which establishes a communication with a network auction server via a manipulation of an operator in accordance with said image information as a single handling unit, when registering said image information pertaining to said auction exhibit item to said network auction server;
displaying said information image to a bidder client;
recording an identification (ID) code of said bidder client when said bidder client requests a notification of the information pertaining to said auction exhibit item, wherein the identification (ID) code identifies an address of the bidder client; and
notifying said address of the bidder client having said ID code registered by displaying an information image in which data of an updated transaction price is superimposed on said information image automatically when a transaction price changes due to a bid submitted by another bidder client,
wherein said notification is done through remote updating of said information that is generated by said network auction server and downloaded by said bidder client.

3. A method of conducting a network auction comprising the steps of:
enabling an auction support server to prompt a registration of an image information pertaining to an auction exhibit item to submit to a network auction server;
creating an information image which combines as a single handling unit said image information pertaining to said auction exhibit item and a related information which establishes communication with a network auction server via a manipulation of an operator in accordance with said image information when said image information is registered;
registering said information image in the network auction server;
recording an identification (ID) code of said bidder client in the auction support server when a bidder client requests a notification of the information on said auction exhibit item after viewing the information image registered, wherein the identification (ID) code identifies an address of the bidder client; and
notifying an updated transaction price from the network auction server to the auction support server, and automatically notifying said updated transaction price from the auction support server to the address of said bidding client having said identification (ID) code when an transaction price changes in the network auction server due to a bid submitted by another bidder client,
wherein said notification is done through remote updating of an information image that is generated by said network auction server and downloaded by said bidder client.

4. A method of a network auction support comprising the steps of:
prompting a registration of information pertaining to an auction exhibit item to submit to a network auction server;
registering said information in said network auction server when said information is registered;
recording an identification (ID) code of said bidder client when a bidder client request a notification of the information pertaining to said auction exhibit item after viewing said registered information, wherein the identification (ID) code identifies an address of the bidder client; and
notifying an updated transaction price automatically to the address of the bidder client having said identification (ID) code registered when it is notified that a transaction price in the network auction server changed due to a bid submitted by another bidder client,
wherein said notification is done through remote updating of an information image that is generated by said network auction server and downloaded by said bidder client.

5. A method of network auction support comprising the steps of:
prompting a registration of an image information pertaining to an auction exhibit item to submit to a network auction server;
creating an information image, which combines an image information pertaining to said auction exhibit item and a related information which establishes communication with a network auction server via manipulation of an operator in accordance with said image information as a single handling unit, when said image information is registered;
registering said information image in the network auction server;
recording an identification (ID) code of a bidder client when said bidder client requests a notification of the information pertaining to said auction exhibit item upon viewing said information image registered, wherein the identification (ID) code identifies an address of the bidder client; and
notifying the address of the bidder client corresponding to said identification code of an updated transaction price automatically when it is informed that a transaction price changes in the network auction server due to a bid submitted by another bidder client,
wherein said notification is done through remote updating of said information image that is generated by said network auction server and downloaded by said bidder client.

6. A method of network auction support comprising the steps of:
prompting a registration of an image information pertaining to an auction exhibit item to submit to a network auction server;
creating an information image, which combines said image information pertaining to said auction exhibit item and a related information which establishes communication with the network auction server via manipulation of an operator in accordance with said image information as a single handling unit, when said image information is registered;

registering said information image in the network auction server; and notifying an address of a first bidder client automatically when a transaction price changes due to a bid submitted by another bidder client, wherein the first bidder client is identified by an identification (ID) code, indicating an address of the first bidder client, wherein said notification is done through remote updating of said information image that is generated by said network auction server and downloaded by said bidder client.

7. A network auction server:

enabling to display information pertaining to an auction exhibit item that has been registered in said network auction server to a bidder client;

recording an identification (ID) code of the bidder client when said bidder client requests a notification of the information pertaining to said auction exhibit item, wherein the identification (ID) code identifies an address of the bidder client; and notifying said address of the bidder client corresponding to said identification code registered automatically of an updated transaction price when a transaction price changes due to a bid submitted by another bidder client, wherein said notification is done through remote updating of said information image that is generated by said network auction server and downloaded by said bidder client.

8. An auction support server:

prompting a registration of an image information pertaining to an auction exhibit item to submit to a network auction server;

creating an information image, which combines said image information pertaining to said auction exhibit item and a related information which establishes communication with the network auction server via manipulation of an operator in accordance with said image information as a single handling unit, upon registration of said image information;

registering said information image in the network auction server; and notifying an address of a first bidder client automatically when a transaction price changes due to a bid submitted by another bidder client, wherein the first bidder client is identified by an identification (ID) code, indicating an address of the first bidder client, wherein said notification is done through remote updating of said information image that is generated by said network auction server and downloaded by said bidder client.

9. A recording medium which stores a program for a computer to execute, said computer functioning as the network auction server as claimed in claim 7.

10. A recording medium which stores a program for a computer to execute, said computer functioning as the auction support server as claimed in claim 8.

* * * * *

UNITED STATES PATENT AND TRADEMARK OFFICE
CERTIFICATE OF CORRECTION

| | | |
|---|---|---|
| PATENT NO. | : 7,310,610 B2 | Page 1 of 1 |
| APPLICATION NO. | : 09/920521 | |
| DATED | : December 18, 2007 | |
| INVENTOR(S) | : Takeshi Fujita et al. | |

It is certified that error appears in the above-identified patent and that said Letters Patent is hereby corrected as shown below:

In claim 3, column 20, lines 1-2, "an transaction" should read --a transaction--.

Signed and Sealed this

Sixteenth Day of September, 2008

JON W. DUDAS
*Director of the United States Patent and Trademark Office*